(No Model.) 3 Sheets—Sheet 1.
J. H. KESTER.
MACHINE FOR CASING AND FLAVORING TOBACCO.
No. 534,162. Patented Feb. 12, 1895.
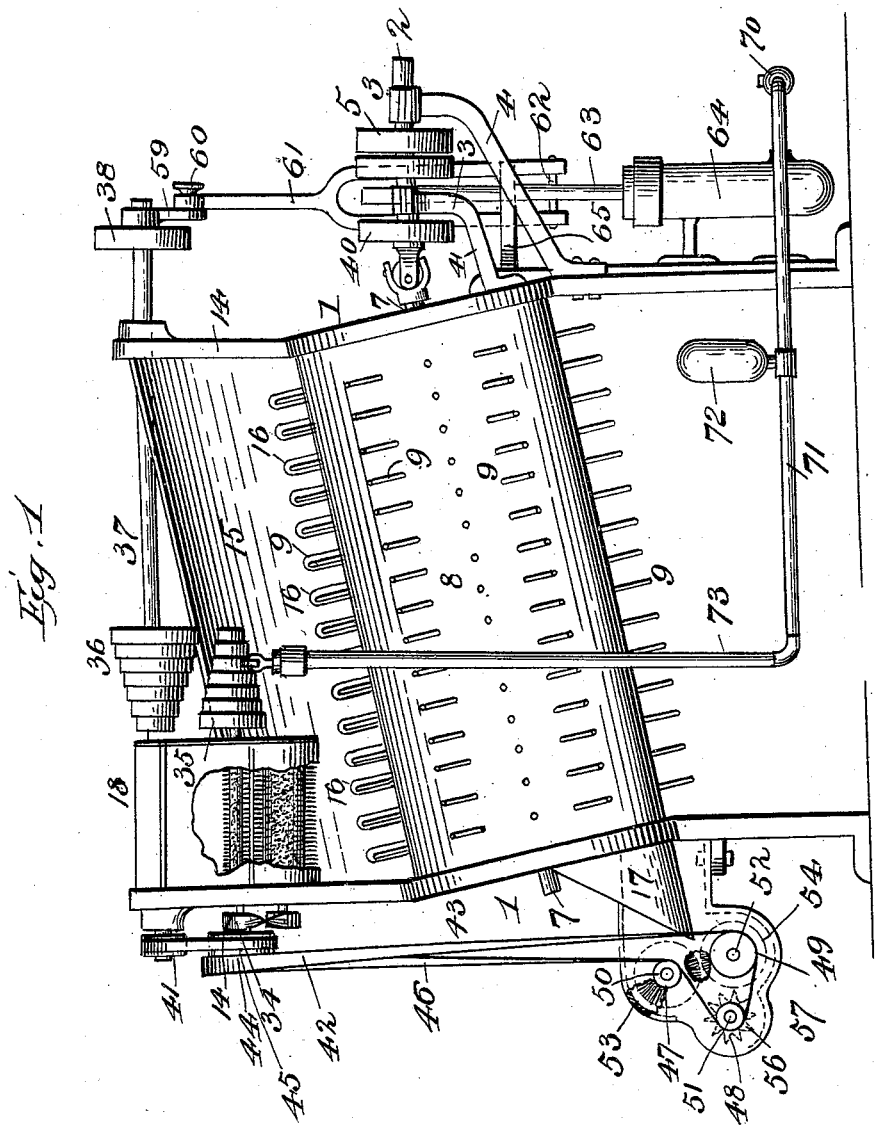
WITNESSES:
F. L. Ourand
[signature]
INVENTOR:
John H. Kester,
By Louis Bagger & Co.
Attorneys (No Model.)  3 Sheets—Sheet 2.
J. H. KESTER.
MACHINE FOR CASING AND FLAVORING TOBACCO.
No. 534,162.  Patented Feb. 12, 1895.
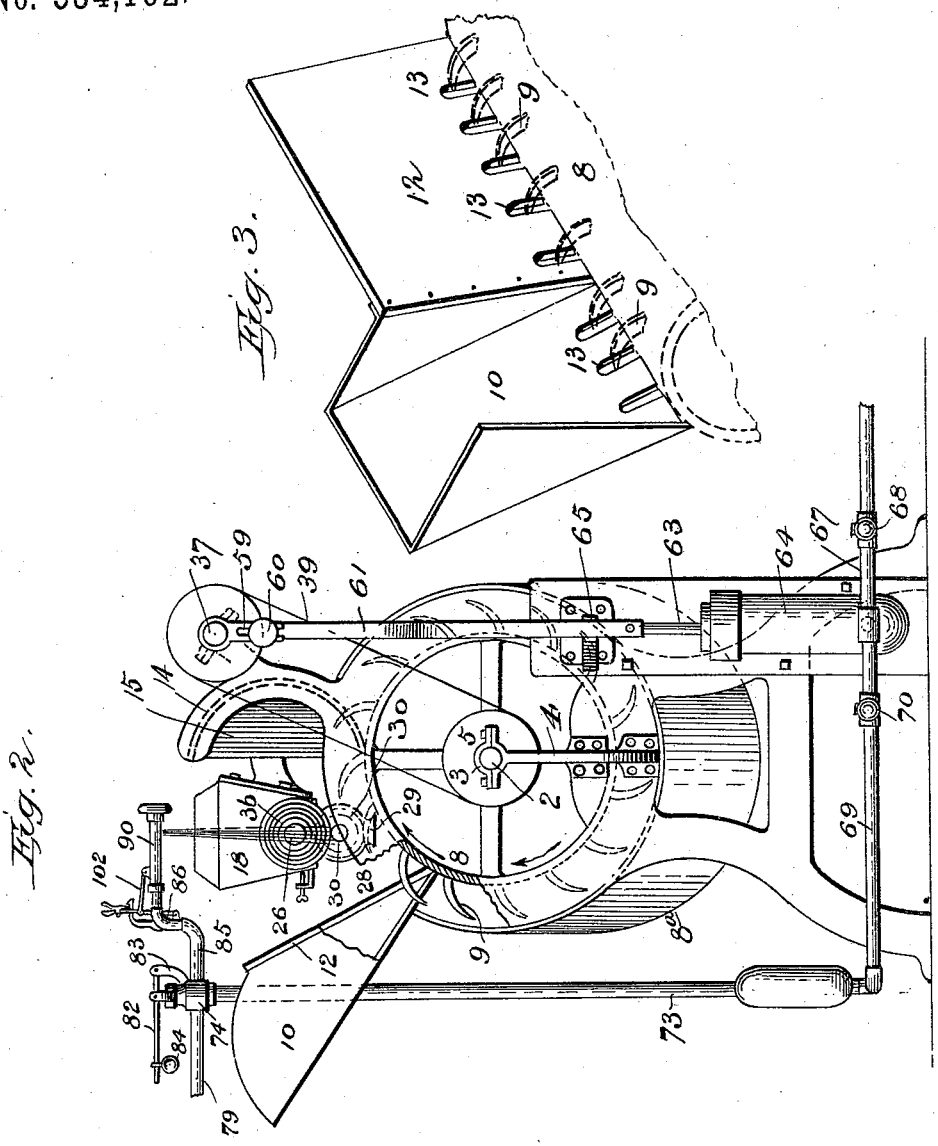
WITNESSES:
INVENTOR:
John H. Kester,

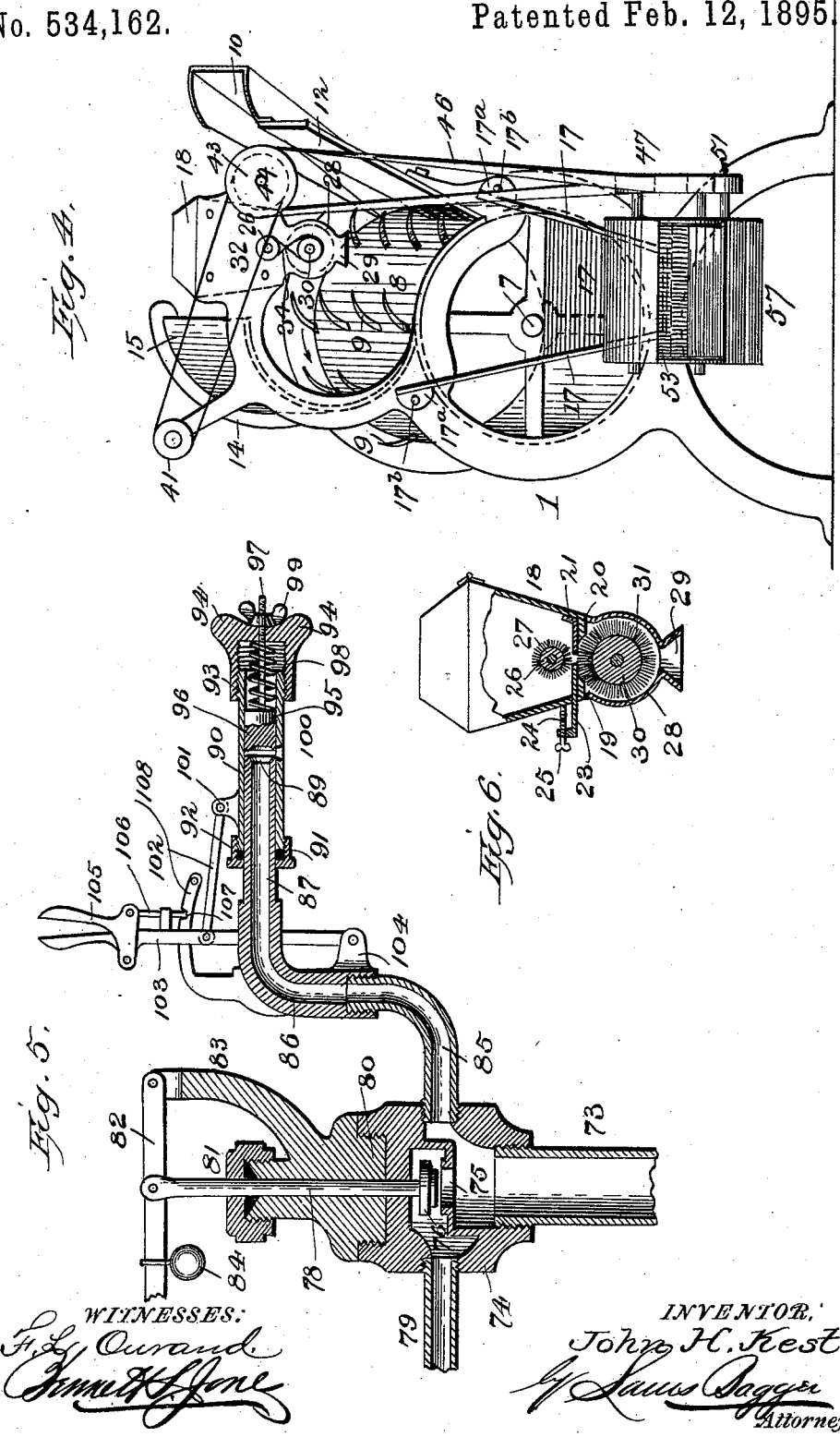

UNITED STATES PATENT OFFICE.

JOHN H. KESTER, OF WINSTON, NORTH CAROLINA.

MACHINE FOR CASING AND FLAVORING TOBACCO.

SPECIFICATION forming part of Letters Patent No. 534,162, dated February 12, 1895.

Application filed August 16, 1894. Serial No. 520,537. (No model.)

*To all whom it may concern:*

Be it known that I, JOHN H. KESTER, a citizen of the United States, and a resident of Winston, in the county of Forsyth and State of North Carolina, have invented certain new and useful Improvements in Machines for Casing and Flavoring Tobacco; and I do hereby declare that the following is a full, clear, and exact description of the invention, which will enable others skilled in the art to which it appertains to make and use the same, reference being had to the accompanying drawings, which form a part of this specification.

My invention relates to improvements in machines for casing and flavoring tobacco, and its object is to provide an improved construction of the same, whereby I secure important advantages, with respect to efficiency in operation.

The invention consists in the novel construction and combination of parts hereinafter fully described and claimed.

In the accompanying drawings—Figure 1 is a side elevation of a casing and flavoring machine, constructed in accordance with my invention, the hopper being removed and the box for containing powdered flavoring material broken away to show the brush cylinders therein. Fig. 2 is an end elevation of the machine. Fig. 3 is a perspective view of the hopper, also showing a portion of the toothed cylinder. Fig. 4 is an elevation looking from the opposite end to that of Fig. 2. Fig. 5 is a horizontal sectional view of the flavor spraying mechanism. Fig. 6 is a transverse sectional view of the box for containing the flavoring powder.

In the said drawings, the reference-numeral 1 designates the frame of the machine consisting of end castings or uprights, connected together by suitable rods or bars.

The numeral 2 designates the main driving shaft journaled in boxes 3 on the upper ends of brackets 4, secured to one of said end castings or uprights. This shaft is provided with driving pulleys 5, connected with any suitable motor, by belts, not shown, and at its inner end is connected by means of a ball and socket or universal joint 6, with an inclined shaft 7, journaled in said end uprights or castings 1. Secured to shaft 7 is an inclined rotatable cylinder 8, provided with a number of curved peripheral teeth 9, arranged in rows therein, and near the upper end of the cylinder at one side of the machine, is a hopper 10, for feeding tobacco to the cylinder. The hopper is provided with a plate 12 which extends to the lower end of the cylinder, with its lower edge resting thereon; slots 13 being formed in said edge to permit of the passage of the teeth 9. Similar slots are also formed in the hopper for the same purpose. At their upper ends the castings or uprights 1 are provided with upwardly extending curved arms 14, formed with grooves in which are seated the ends of an inclined concave 15, consisting of a semi-circular sheet metal plate the lower edge of which rests on the cylinder 8, and is provided with slots 16, for the passage of the teeth 9. The said cylinder at its lower side is provided with a casing 8$^a$, extending around the same from the concave to the hopper. Secured to the casting or upright 1, by means of lugs 17$^a$ and bolts 17$^b$ at the lower end of the cylinder, is a chute or trough 17, which carries the tobacco from the concave to the brushes hereinafter described for smoothing the flavoring material and distributing it evenly over the tobacco.

Located at one end of the machine and at one side thereof is a box 18, for containing powdered flavoring material, which box is secured to the casting or upright 1, at that end of the machine. The bottom of this box is formed with a longitudinal opening 19, and secured to said bottom is a stationary plate 20, having an upwardly extending flange 21, at its outer end which abuts against one of the sides of the box. This plate 20 extends from end to end of the box, and to near the center thereof. Passing through an opening in the side of the box, opposite to plate 20, is a slide 23, having an upwardly extending flange 24, at its outer end, provided with a screw-threaded hole or aperture through which passes a thumb-screw 25 the inner end of which abuts against the box 18. The object of this construction is to provide means for regulating the feed of the flavoring material contained in the box. By rotating the thumb-screw, so as to force the slide inwardly toward the plate 20, the feed opening therebetween will be decreased in area, while by forcing the said screw outward, it will be increased. Located in box 18, is a shaft 26 provided with a brush cylinder 27. To the lower end of the said box is secured a cylindrical extension 28, open at its lower end, and provided with a flaring outlet 29. Journaled in said extension is a shaft 30, provided with a brush cylinder 31. These cylinders 27 and 31, rotate in opposite directions, and form a force feed for feeding the powdered flavoring material to the rotatable cylinder 8 below. The outer ends of shaft 26 and 30 are provided with pulleys 32, connected together by a crossed belt 34. The inner end of shaft 26 is provided with a series of cone pulleys 35, connected by a belt, not shown, with a series of similar pulleys 36, differentially arranged on a shaft 37, so as to change the speed of said shaft, as will be well understood. The shaft 37 at one end is provided with a pulley 38, connected by a belt 39, with a pulley 40, on the driving shaft 2. At its opposite end the shaft 37 is provided with a pulley 41, connected by a belt 42 with a pulley 43 on a stud shaft 44, on one of the end castings 1. Secured to pulley 41, so as to rotate therewith, is a pulley 45, over which passes a belt 46, which also passes around pulleys 47, 48, and 49, on shafts 50, 51, and 52, the pulleys 47 and 48, being smaller than pulley 49, so that they will rotate faster than said last-mentioned pulley. Secured to the shafts 50 and 52 are brush cylinders 53, and 54, the cylinder 53 rotating faster than cylinder 54, by the means just described. The shaft 51 is provided with a ribbed cylinder 56 and rotates at the same speed as cylinder 53. These cylinders are located in a housing 57, at one end of the machine, with which the trough or chute 17 communicates, and which housing is provided with an outlet 58, the purpose of all of which will be hereinafter explained.

Located about the center of the machine, above the rotatable cylinder 8, is a spraying device, which I will now describe.

The numeral 59 designates a crank, secured to one end of shaft 37, and is provided with a wrist-pin 60, with which is connected a bifurcated pitman 61. To the lower ends of this pitman, is connected by means of a rod 62, a piston 63, of a force pump 64, the said piston working in a guide 65, secured to one of the end castings or uprights 1. The pump is provided with an inlet pipe 67, leading to any suitable source of supply, and is provided with a check valve 68. Said pump is also provided with an exit pipe 69, provided with a check valve 70. These valves are of any suitable construction, and work opposite to each other, so that, as one opens, the other closes, as will be well understood. Pipe 69 is connected with a pipe 71 running at right angles thereto, and extending to about the center of the machine, and is provided with an air-cylinder 72. Connected with this pipe 71, is a vertical pipe 73, provided at its upper end with a valve-box 74, provided with an opening 75, which is closed by a relief-valve 76, secured to the lower end of a vertical stem 78. This opening communicates with an overflow pipe, 79, which leads to any suitable receptacle. The valve stem 78 passes through a cap 80, secured to the valve casing, and is provided with a stuffing box 81, and at its upper end is pivoted to a lever 82, pivoted at one end to an arm 83 formed with the cap 80. The free end of this lever is provided with an adjustable weight 84. Connected with the valve casing or box, below the valve 76, is a pipe 85, with which is connected an elbow 86, which in turn is connected with an inwardly extending pipe 87, the end of which is formed with a beveled groove 89. Mounted upon this pipe is a slidable sleeve 90, provided with a screw-cap 91, and a packing 92. The opposite end of said pipe is screw-threaded with which engages a corresponding threaded cap 93, having wings 94, by which it may be rotated. Located in said sleeve is a plug 95, having its inner end formed with a beveled recess 96, which plug is provided with a pin 97, encircled by a coiled spring 98. Said pin passes through the cap 93, and is screw-threaded and provided with a thumb-nut 99, by which the distance between the pipe 87, and plug 95 may be regulated to increase or decrease the feed space therebetween. The pipe 87 on its under side is provided with an opening 100. On the upper side of this sleeve 90 is a lug 101, to which is pivoted a rod 102, which in turn is pivoted to a vertical lever 103, the lower end of which is fulcrumed in a lug 104, secured to the elbow 86. The upper end of this lever is provided with a hand lever 105, having a pivoted dog, 106, which engages with notches 107, in a segment 108, secured to said elbow.

The operation is as follows: The box 18 is filled with any suitable powdered flavoring material, and the pump is connected with a liquid flavoring composition, such as a licorice solution. The machine is then set in motion, when the cylinder 8 will be rotated in the direction shown by the arrow in Figs. 2 and 3. Tobacco is now fed to the machine, through the hopper 10, which will fall upon the cylinder and be caught by the fingers 9 and forced up into the concave 15, from whence it will fall back upon the cylinder, and by reason of the inclination of the latter, will gravitate toward the end thereof from whence it will escape to the chute below. While this operation is taking place, the brush cylinders in the box 18, are forcing the powdered flavoring material contained in the box, down upon the tobacco. The pump 64 is also operated at the same time, alternately drawing the licorice solution thereinto, and forcing it out through the pipes 69, 71 and 73 to the valve box 74, and from thence through pipe 85, elbow 86 and the sleeve 90, and the opening 100, in the latter, down upon the tobacco. Before starting the machine, however, the distance of plug 95 from the end of pipe 87, is regulated by means of the thumb-nut 99, and pin 97, so as to allow the proper quantity of the solution to be fed to the opening 100. The object of the spring 98 is to allow the plug to give in case of any undue pressure in the pipe 87, and the tension of the spring is regulated by the cap 93. The object of the sliding sleeve 90, is in case the feed space between the ends of pipe 87, and plug 95, should become clogged, to enlarge said area, and allow the obstructions to be blown out, without stopping the machine. This is done by means of the lever 103, by means of which the plug can be moved farther away from the pipe 87, thus increasing the distance therebetween.

The purpose of the relief valve 76 is to regulate the pressure in the spraying device. This is accomplished by means of the weight 84, lever 82, and stem 78. The weight is adjusted so that the valve will bear upon its seat with the proper degree of pressure, and in case this pressure is exceeded, in the pipes leading to the pump, the valve will rise and allow a portion of the solution to escape through pipe 79 until equilibrium is again established, when the valve will automatically seat itself.

The object of the brush cylinders 53 and 54, is to cause the flavoring materials or compositions to be smoothly laid upon the tobacco, as it comes from the chute 17, which is accomplished by reason of the cylinder 53 rotating faster than cylinder 54, whereby they are caused to exert a kind of rubbing action of the tobacco, as it passes between them. The cylinder 56, which I term a beating cylinder, is to strike and loosen the tobacco as it emerges from between the cylinders 53, and 54, and throw it out of the opening in the housing 57.

By reason of the cylinder being inclined, the tobacco as it is fed to the hopper is caught by the teeth of the cylinder and forced over against the concave which will cause it to fall back upon the cylinder when it will be caught by the teeth of the next succeeding row when the operation will be repeated. This will be continued until the tobacco reaches the lower end of the machine from whence it will fall into the chute. The object of the plate 12, is to prevent any tobacco from falling out of the machine when it is thrown over onto the cylinder from the concave. The purpose of the casing 8ª is to prevent any tobacco which may escape through the slots in the concave and plate 12 from falling on the floor.

Having thus fully described my invention, what I claim is—

1. In a machine for casing and flavoring tobacco, the combination of the inclined rotatable cylinder provided with peripheral teeth, the concave having slots for the passage of said teeth, located above and at one side of the cylinder, the hopper, the plate secured thereto having slots for the passage of said teeth, and the chute, said concave and cylinder co-operating to feed the tobacco to the lower end of the machine, substantially as described.

2. In a machine for casing and flavoring tobacco, the combination with the inclined rotatable cylinder, provided with peripheral teeth, the hopper, the plate secured thereto provided with slots, the concave having slots for the passage of said teeth located above and at one side of said cylinder and co-operating with the teeth to feed the tobacco to the lower end of the machine, and the chute, of a flavoring mechanism located above said cylinder for feeding flavoring material or composition upon the tobacco on said cylinder, substantially as described.

3. In a machine for casing and flavoring tobacco, the combination with the inclined rotatable cylinder provided with peripheral teeth, the hopper, the plate secured thereto provided with slots, for the passage of said teeth, the concave also provided with slots for the passage of said teeth and located above and at one side of said cylinder, co-operating with said teeth to feed the tobacco to the lower end of the machine, and the chute, of a flavoring mechanism located above said cylinder, and the brush cylinders located at the mouth of the chute and running at different speeds, substantially as described.

4. In a machine for casing and flavoring tobacco, the combination with the inclined rotatable cylinder, provided with peripheral teeth, the hopper, the plate secured thereto, the concave co-operating with said teeth to feed the tobacco to the lower end of the machine, the chute and a flavoring mechanism located above the said cylinder, said plate and concave being provided with slots for the passage of said teeth, of the brush cylinders located at the mouth of the chute and running at different speeds, the housing having an outlet and the beater cylinder, substantially as described.

5. In a tobacco casing and flavoring machine the combination with the inclined rotatable cylinder having peripheral teeth, the hopper, the plate secured thereto, the concave co-operating with the said teeth to feed the tobacco to the lower end of the machine, and the chute, and said concave and plate being provided with slots for the passage of said teeth, of the box located at one end of the machine, above said cylinder, for containing powdered flavoring material, having a feed opening in its bottom, the cylindrical extension secured to said box and the oppositely rotatable brush cylinders located in said box and extension, substantially as described.

6. In a machine for casing and flavoring tobacco, the combination with the inclined rotatable cylinder, having peripheral teeth, the hopper, the plate secured thereto, and the concave provided with slots for the passage of said teeth, and the chute, the concave co-operating with said teeth to feed the tobacco to the chute, of the box located at one end of the machine above said cylinder, having a feed opening in the bottom, the extension secured to said box, the rotatable brush cylinders located in said box and extension, the plate secured to the bottom of the box, the slide having an upwardly projecting flange and the thumb screw passing through said flange and its inner end abutting against the box, substantially as described.

7. In a machine for casing and flavoring tobacco, the combination with the frame, the inclined shaft journaled therein, the driving shaft connected therewith by a knuckle joint, the inclined cylinder mounted on said shaft, having peripheral teeth, the concave provided with slots for the passage of said teeth, the hopper and the chute, the concave co-operating with said teeth to feed the tobacco to the chute, of the box located above said cylinder for containing powdered flavoring material and having a feed opening in its bottom, the extension secured to said box, the shafts having brush cylinders located in said box and extension, the pulleys on the ends of said shafts, connected by a crossed belt, the cone pulleys on one of said shafts, the shaft having similar pulleys connected therewith, the pulleys on one end of said last mentioned shaft one of which is connected with a pulley on the driving shaft and the other connected with pulleys on a stud shaft, the brush cylinders located at the mouth of the chute, running at differential speeds, the beater cylinder, the shafts upon which said cylinders are mounted provided with pulleys and the belt passing around said pulley and one of the pulleys on the stud shaft, substantially as described.

8. In a machine for casing and flavoring tobacco, the combination with the inclined rotatable cylinder, having peripheral teeth, the hopper, the plate secured thereto having slots for the passage of said teeth, the concave also provided with slots for the passage of the teeth, located above and at one side of the cylinder, and co-operating with the teeth to feed the tobacco to the lower end of the machine, and the chute, of the mechanism for spraying liquid flavoring solution located above said cylinder and the force pump connected therewith, substantially as described.

9. In a machine for casing and flavoring tobacco, the combination with the inclined rotatable cylinder having peripheral teeth, the concave, and inclined plate provided with slots for the passage of the teeth, the hopper and the chute, said concave and teeth co-operating to feed the tobacco to the chute, of the spraying device located above said cylinder, the pipes connected therewith, the force pump connected with said pipes and the relief valve located intermediate the spraying device and pump, and the overflow pipe, substantially as described.

10. In a spraying device for tobacco casing and flavoring machines, the combination with a force pump and the inlet and outlet pipes connected therewith, of the sleeve on the outlet pipe, having a feed opening therein, the slidable plug located in said sleeve, the cap at the outer end of said sleeve, the rod connected with the plug passing through said cap and provided with a thumb nut, substantially as described.

11. In a spraying device, the combination with the pipe and a force pump connected therewith, of the sleeve on the outer end of said pipe having a feed opening in the under side, the cap connected with the outer end of said sleeve, the movable plug located in said sleeve provided with a stem passing through said cap and having a screw threaded end, the thumb nut on the stem and the coiled spring encircling said rod, substantially as described.

12. In a spraying device for tobacco casing and flavoring machines, the combination with the pipe and a force pump connected therewith, of the sleeve on the outer end of said pipe having a feed opening in its under side, the movable plug located in said sleeve, the rod or stem on the plug and the thumb nut, the coiled spring encircling said rod and the adjustable cap on the sleeve through which said rod passes for regulating the tension of the spring, substantially as described.

13. In a spraying device for tobacco casing and flavoring machines the combination with the pipe and a force pump connected therewith, the slidable sleeve on the outer end of said pipe having a feed opening in its under side, the cap on the outer end of said sleeve, the movable plug located therein, the rod secured to said plug and passing through the cap and provided with a thumb nut, the coiled spring encircling said rod and means substantially as described for actuating said slide.

14. In a machine for casing and flavoring tobacco, the combination with the inclined rotatable cylinder having peripheral teeth, and its shaft, the driving shaft connected with said shaft by a knuckle joint, the concave and inclined plate provided with slots for the passage of said teeth, the hopper and the chute, said concave and the teeth on the cylinder co-operating to feed the tobacco to the chute, of the shaft at the top of the machine provided with a pulley and a crank, the pitman, the piston rod and pump, the pipes connected with said pump, and the spraying device, substantially as described, connected with said pipes.

15. In a tobacco casing and flavoring machine, the combination with the inclined rotatable cylinder, having peripheral teeth, its shaft, the driving shaft connected therewith by a knuckle joint, the concave and inclined plate provided with slots for the passage of said teeth, the hopper and the chute, said concave and the teeth of the cylinder co-operating to feed the tobacco to the chute, of the horizontal shaft at the top of the machine having a pulley and crank at one end, the pitman connected with said crank, the piston rod and pump, the pipes connected with said pump, the spraying mechanism connected with said pipes, the pulley at the opposite end of said horizontal shaft, the pulleys below the same, the belt connecting one of said pulleys with the pulley on the horizontal shaft, the shafts located at the mouth of the chute provided with differential pulleys and brush cylinder, the beater shaft and its pulley and cylinder and the belt passing around said pulleys and around one of the pulleys below the horizontal shaft, substantially as described.

In testimony that I claim the foregoing as my own I have hereunto affixed my signature in presence of two witnesses.

JOHN H. KESTER.

Witnesses:
BENNETT S. JONES,
M. S. DUCKETT.